(12) United States Patent
Ardeli et al.

(10) Patent No.: US 10,771,391 B2
(45) Date of Patent: Sep. 8, 2020

(54) POLICY ENFORCEMENT BASED ON HOST VALUE CLASSIFICATION

(71) Applicant: HEWLETT PACKARD ENTERPRISE DEVELOPMENT LP, Houston, TX (US)

(72) Inventors: Ramesh Ardeli, Sunnyvale, CA (US); Venkatesan Marichetty, Sunnyvale, CA (US); Hari Krishna Kurmala, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/773,771

(22) PCT Filed: Nov. 5, 2015

(86) PCT No.: PCT/US2015/059178
§ 371 (c)(1),
(2) Date: May 4, 2018

(87) PCT Pub. No.: WO2017/078715
PCT Pub. Date: May 11, 2017

(65) Prior Publication Data
US 2018/0331957 A1 Nov. 15, 2018

(51) Int. Cl.
*H04L 12/813* (2013.01)
*H04L 12/741* (2013.01)
(Continued)

(52) U.S. Cl.
CPC ............ *H04L 47/20* (2013.01); *H04L 45/745* (2013.01); *H04L 47/2441* (2013.01);
(Continued)

(58) Field of Classification Search
CPC ...................................................... H04L 47/20
See application file for complete search history.

(56) References Cited

U.S. PATENT DOCUMENTS

| 7,685,279 B2 | 3/2010 | Miltonberger et al. |
| 8,127,008 B2 | 2/2012 | Manning et al. |

(Continued)

FOREIGN PATENT DOCUMENTS

EP  1011244 A2 *  6/2000  ............. H04L 29/06

OTHER PUBLICATIONS

BIGIP Application Security Manager, Datasheet, Aug. 27, 2014, pp. 1-16, F5 Networks, Inc., USA.
(Continued)

*Primary Examiner* — Samina F Choudhry
(74) *Attorney, Agent, or Firm* — Hewlett Packard Enterprise Patent Department (57) ABSTRACT

Examples disclosed herein relate to enforcing a policy to a packet stream based on a classification and a determination that a proxy connection is associated with the packet stream. In the example, the packet stream is received. In this example, a host value is determined for the packet stream. Also, in the example, it is determined whether the packet stream is associated with the proxy connection. Further, in the example, a classification is determined based on the host value. In this example, the policy is enforced for the packet stream based on the classification and the determination that the proxy connection is associated with the packet stream.

15 Claims, 5 Drawing Sheets

(51) Int. Cl.
*H04L 12/851* (2013.01)
*H04L 12/823* (2013.01)
*H04L 29/06* (2006.01)
*H04L 29/08* (2006.01)

(52) U.S. Cl.
CPC .......... *H04L 47/32* (2013.01); *H04L 63/0281* (2013.01); *H04L 67/2804* (2013.01)

(56) References Cited

U.S. PATENT DOCUMENTS

| | | |
|---|---|---|
| 8,615,605 B2 | 12/2013 | Yu et al. |
| 8,701,010 B2 | 4/2014 | Plamondon |
| 9,015,090 B2 | 4/2015 | Chien |
| 9,069,599 B2 | 6/2015 | Martinez et al. |
| 2006/0056317 A1 | 3/2006 | Manning et al. |
| 2006/0075084 A1* | 4/2006 | Lyon .................. H04L 29/06027 709/223 |
| 2009/0240874 A1* | 9/2009 | Pong .................. G06F 12/0223 711/105 |
| 2011/0296519 A1* | 12/2011 | Ide .................. G06F 21/30 726/13 |
| 2012/0278487 A1 | 11/2012 | Woelfel |
| 2013/0191494 A1* | 7/2013 | Sidhu .................. H04L 67/34 709/217 |
| 2014/0068001 A1* | 3/2014 | Shen .................. H04L 67/2814 709/217 |
| 2014/0094159 A1* | 4/2014 | Raleigh .................. H04W 24/02 455/418 |
| 2014/0259094 A1 | 9/2014 | Narayanaswamy et al. |
| 2015/0215359 A1* | 7/2015 | Bao .................. H04L 65/605 709/219 |

OTHER PUBLICATIONS

PCT International Search Report issued in Appl. No. PCT/US2015/059178, dated Aug. 1, 2016; 3 pages.

Product Guide: Revision A: McAfee Firewall Enterprise Control Center, Version 5.3.1, Mar. 26, 2013, pp. 1-496, McAfee.

* cited by examiner

POLICY ENFORCEMENT BASED ON HOST VALUE CLASSIFICATION

BACKGROUND

Computing networks can include multiple network devices such as routers, switches, hubs, servers, desktop computers, laptops, workstations, network printers, network scanners, etc. that are networked together across a local area network (LAN), wide area network (WAN), wireless networks, etc. Networks can include deep packet inspection devices, firewalls, etc. to detect unwanted activity acting on the computer network.

BRIEF DESCRIPTION OF THE DRAWINGS

The following detailed description references the drawings, wherein.

DETAILED DESCRIPTION

Security services can help track down malicious traffic such as malware/spyware botnet attack traffic. In some examples, the security services can track malicious traffic based on an Internet Protocol (IP) address or geolocation, such as the location of an IP address in a country and/or city. In the example of geolocation, evidence shows that particular countries and/or locations within countries are known for originating malware/spyware traffic, and/or other types of attacks such as Distributed Denial of Service (DDoS) attacks. A device such as a network appliance (e.g., a firewall, an intrusion prevention system, etc.) can use this information to protect a private network by enforcing policies on network traffic.

To enforce the policies on network traffic, the device can inspect the IP address of the traffic to identify the source and/or destination. In some examples, the IP address can be compared to a list, such as a whitelist and/or blacklist to determine whether the network traffic is permissible. In other examples, the IP address can be used to determine a geolocation of the source and/or destination of the network traffic. The geolocation(s) can be compared to a list of locations (e.g., countries, cities, etc.) to determine whether the network traffic is permissible.

However, if a proxy server is deployed as an intermediary between the source and the destination, using the IP address of the source and/or destination for determining which traffic is permissible may not be properly enforced. For example, if a proxy server is used, the proxy server's IP address may be used as the source and/or destination address of packets in a packet stream. The proxy server would establish another connection to the actual source and/or destination used in the communications. As such, client devices on the private network may be able to communicate with devices such as servers that should not be permitted to communicate with the client devices according to a policy (e.g., a server that is blacklisted, a server located in a location known for malicious activity, etc.). As used herein a "packet stream" is a set of packets that can be identified as belonging to a communication from two devices. An example of a packet stream is a packet flow, which is a set of packets that belong to a specific transport connection or media stream. In some examples, the packet stream can refer to a communication session between two or more devices.

Various examples disclosed herein relate to detecting whether a proxy connection is being used by a packet stream and using a host value from a message to determine whether to permit packets of the packet stream. Various approaches can be used to determine whether a proxy server is used. In one example, a destination IP address can be compared to a list of IP addresses known to be proxy servers.

In another example, packet inspection can be used to determine the host value of a message in the packet stream between the source and the destination. The message can be associated with a protocol, such as the Hypertext Transfer Protocol (HTTP) or HTTP Secure (HTTPS). Moreover, the message can be a message that requests a resource, such as a GET message. The GET message can be inspected to determine whether an absolute value is used for a Uniform Resource Identifier (URI). If the URI is absolute, then a correlation can be made that the packet stream is using a proxy server.

Further, in another example, the message can be a CONNECT message that is used to request that a proxy server establish a tunnel between two endpoints of the packet stream. This can be used, for example, with the HTTPS protocol. The presence of CONNECT message can be used to determine that a proxy server is being used.

As noted, the device can intercept a message that includes a host value. The message can be a packet that has a known set location for the host value. In some examples, the message can be a CONNECT message or a GET message. Packet inspection can be used to determine the host value. The host value is a field that includes the host server that is to respond to the message.

An IP address associated with the host value is looked up. This can be accomplished using a cache as described below and/or using a Domain Name System (DNS). The IP address from the host value can be used to determine whether network traffic of the packets in the packet stream is permissible. In one example, the IP address derived from the host value can be compared to a list (e.g., a blacklist or a whitelist). In another example, the IP address can be used to determine a geolocation associated with the host value. The geolocation can be used to determine whether the network traffic is permissible. As further detailed below, the geolocation may also be implemented using a cache.

Figure 1:
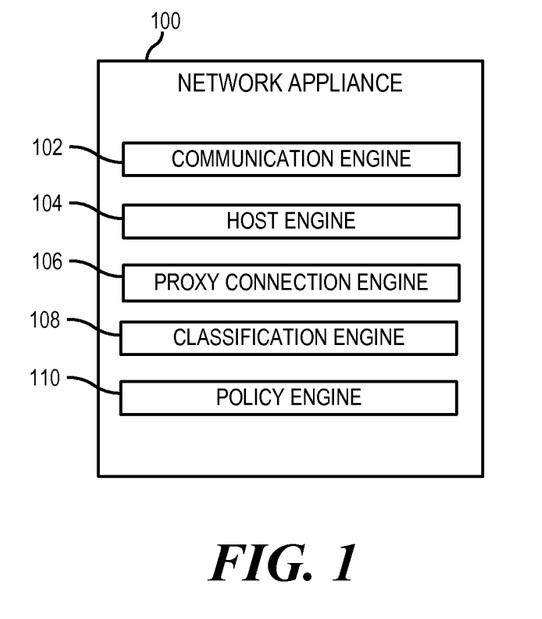
FIG. 1 is a block diagram of a network appliances capable of enforcing a policy to a packet stream traveling via a proxy server, according to one example.
Figure 2:
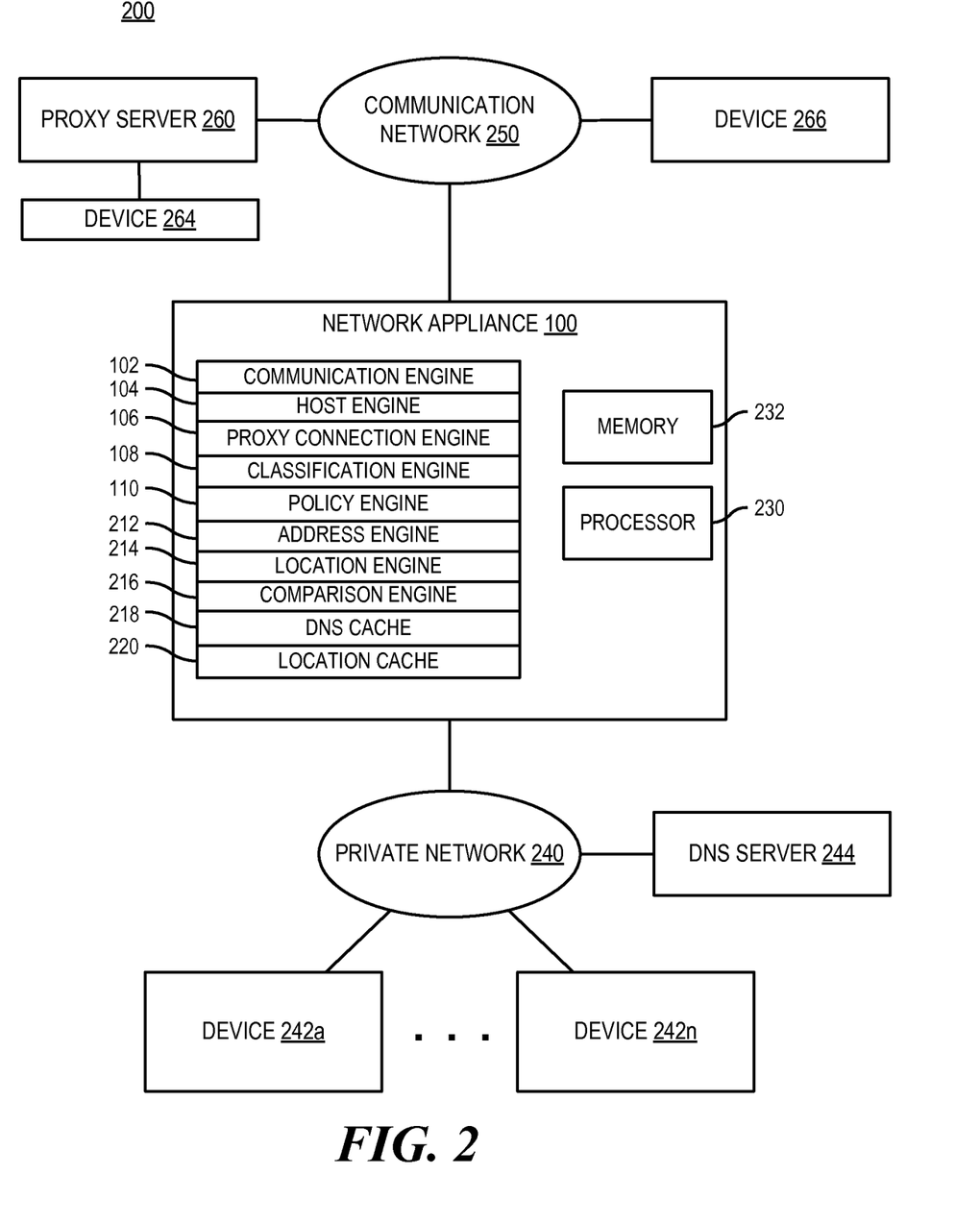
FIG. 2 is a block diagram of a system including a network appliance capable of enforcing a policy to a packet stream traveling via a proxy server, according to an example.

FIG. 1 is a block diagram of a network appliances capable of enforcing a policy to a packet stream traveling via a proxy server, according to one example. FIG. 2 is a block diagram of a system including a network appliance capable of enforcing a policy to a packet stream traveling via a proxy server, according to an example. Network appliance 100 includes components that can be utilized to apply a policy to packets in a packet stream. In one example, the policy can be based on a packets traveling via the proxy server. The respective network appliance may be a server, a desktop computer, firewall device, a wireless device, a workstation, or any other computing device that is capable of providing the functionality described herein. As used herein, a network appliance is an add-on device, for example, a plug-in or application device capable of applying the policy or set of policies on a packet stream as described herein.

In one example, network appliance 100 can include a communication engine 102, a host engine 104, a proxy connection engine 106, a classification engine 108, and a policy engine 110. In the example of FIG. 2, the network appliance 100 can also include an address engine 212, a location engine 214, a comparison engine 216, a DNS cache 218, a location cache 220, a processor(s) 230, memory 232, combinations thereof, etc.

Communication engine 102 can be used to communicate with other devices, for example, via a private network 240 or communication network 250. Communication engine 102 may include components used to implement networking, for example, a network interface card, other logic, etc. In some examples, one or multiple network appliances 100 can be placed on an edge of a private network 240 to protect the private network 240. In one example, the private network 240 can be a campus network, which is a computer network made up of an interconnection of Local Area Networks (LANs) within a geographical area, network traffic may travel through multiple network infrastructure devices (e.g., switches, routers, wireless access points, etc.) to go from a source to a destination.

Network appliance 100 can inspect traffic to monitor and control incoming and/or outgoing traffic based on a rule, multiple rules, a policy, multiple policies, etc. In certain examples, the network appliance 100, can be used to establish a barrier between the private network 240 and another outside network, for example, communication network 250 (e.g., the Internet). Network traffic can pass through the network appliance 100 from devices such as devices 242a-242n to other devices, for example, proxy server 260, device 264, device 266, etc. Though network appliance 100 is located at the edge of a private network 240 to an outside network, it is contemplated that the network appliance 100 can be implemented in various locations of a network communication path.

As noted above, information about a device 264, 266 that a device 242 in the private network 240 is communicating with can be used to implement a policy. In one example, a policy can perform an action based on the location of the device outside of the private network 240. In another example, a policy can perform an action based on whether an IP address associated with the device is on a list (e.g., a whitelist, a blacklist, etc.). However, if a proxy server 260 is deployed between the device 242 in the private network 240 and a device (e.g., device 264) outside of the private network 240, the IP address in a header that is associated with the outside device could show as the proxy server 260 instead of the actual device because the traffic would go to the proxy server(s) 260, which would then establish a connection to the outside device (e.g., via a chain of proxy servers). In one example, a connection between device 242a and an outside device can be established.

The proxy connection engine 106 can be used to determine whether a packet stream for the connection is associated with a proxy connection. A packet stream is considered to be associated with the proxy connection if the packet stream travels through a proxy server 260 on its way to an end device such as device 264. On the other hand, the packet stream is not considered to be associated with the proxy connection if the packet stream does not travel through a proxy server, for example, in a path to device 266.

The proxy connection engine 106 can determine whether a proxy connection is present using various methods. In one example, an IP address in a header of a packet of the packet stream can be compared to a list of IP addresses of known or assumed proxy servers. If the IP address matches the list, then it is determined that the proxy connection is present. In another example, the presence of a particular message can identify that a proxy server is being used. For example, if an HTTPS CONNECT message is present, it is determined that the proxy connection is present.

In a further example, a message can be inspected to determine whether the proxy connection is present. For example, the HTTP GET message can be intercepted and examined. The message can include a URI. Packet inspection can identify and examine the URI. In one example, if the URI is absolute, then the proxy connection engine 106 can determine that the message is associated with a proxy connection. In another example, if the URI is relative, the proxy connection engine 106 can determine that the message is not associated with the proxy connection. As used herein, a relative URI does not include naming scheme information while an absolute URI includes full naming scheme information. For example, an absolute URI may include http://[hostvalue]/folder/page.html while a corresponding relative URI would include /folder/page.html. A relative URI would depend on a host value that can also be located in the GET message. The URI can be located in a particular field of the message.

The host engine 104 can determine a host value for the packet stream from a message of the packet stream. The host value determination can be in response to a determination that the packet stream is associated with a proxy connection. The host value can be located in a particular field in the message (e.g., a GET message). The host value can represent a true end device for the packet stream. This can be in contrast to an IP address in a header, which may lead to a proxy server instead of an end device.

An address engine 212 can be used to determine an address (e.g., an IP address) associated with the host value. In one example, the network appliance 100 can include a DNS cache 218 to help determine the address. For example, the host value can be looked up using the DNS cache 218. If the host value is not in the DNS cache 218, the address engine 212 can query a DNS server 244 for the DNS host. When the DNS server 244 returns an address for the query, the address can be added to the DNS cache 218. Though the DNS server 244 is shown as local to the private network 240, it is contemplated that the DNS server 244 can be a part of another network. A benefit of having the onboard DNS cache 218 is an increased speed in determining the address. For example, the host value can be used to determine an IP address for device 264 even though a direct IP address in a header for the packet stream shows proxy server 260 as a destination.

Classification engine 108 can determine a classification associated with the host value. In one example, the classification can be determined directly based on the host value (e.g., based on a comparison of the host value to a list). In another example, the classification can be indirect. For example, the address can be determined based on the host value and the address can used to determine the classification. In another example, the address can further be used to determine a geolocation, which can be used for the classification. As such, the classification can include the geographic location. In a further example, the classification can relate to a reputation of the host value, address, geolocation, etc.

In one example, the classification engine 108 can use the comparison engine 216 to determine whether the address or host value matches a list that is associated with the classification. If the address or host value matches the list, a particular classification associated with the address or host value on the list can be used. For example, the list can be a black list where a match signifies an address or host value that is malicious or assumed to be malicious. The classification here could be malicious. In other examples, another approach can be used for the classification engine 108 to classify an address and/or host value.

Further, in some examples, a classification can be based on a location associated with the host value and/or address. A location cache 220 can be kept on the network appliance 100. A location engine 214 can determine a location for host value and/or address. In some examples, the location cache 220 can include a list of IP addresses and/or ranges and corresponding geolocations. In other examples, the location cache 220 can include a list of host values or other identifiers (e.g., a hash of an IP address) and the corresponding geolocation(s). Moreover, the list(s) may include granularity (e.g., a country, a state, a town, etc.). In some examples, if a geolocation is not in the location cache 220, a server (not shown) including the location information can be queried. The additional location information can be added to the location cache 220. In some examples, the classification can be the geolocation. In other examples, the classification can be based on the geolocation, for example, a reputation based on the geolocation.

The policy engine 110 can enforce or apply a policy to the packet stream based on the classification. As used herein, enforcing a policy to the packet stream includes performing an action according to the policy on multiple packets of the packet stream. In one example, the action can apply to each of the packets of the packet stream passing through the network appliance 100 after the policy is implemented. The policy can further be based on the determination that the proxy connection is associated with the packet stream. For example, looking up the host value need not be performed if there is not a proxy connection associated with the packet stream.

In one example, the policy can include blocking the packet stream. In the example of the packet stream representing a session between two devices, the session can be blocked. Blocking can include dropping a packet or multiple packets of the packet stream. Other security actions or policies can also be implemented. In one example, a security action may be taken to allow the traffic to flow through the network appliance 100 if the classification is deemed to be benign. In another example, a security action may be taken to divert the traffic into another device or module (e.g., a deep packet inspection device, another security platform for analysis, etc.) for additional analysis. In a further example, a security action may be taken to inform the internal device 242 not to communicate with the external device 264. In some examples, the classification can lead to a policy decision that that the traffic is benign or not known to be malicious and the traffic is allowed to proceed.

The engines 102, 104, 106, 108, 110, 212, 214, 216 include hardware and/or combinations of hardware and programming to perform functions provided herein. Moreover, modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 230, such as a central processing unit (CPU) or a microprocessor suitable for retrieval and execution of instructions and/or electronic circuits can be configured to perform the functionality of any of the engines described herein. In certain scenarios, instructions and/or other information, such as topology, classifications, rules, policies, etc., can be included in memory 232 or other memory. Moreover, in certain implementations, some components can be utilized to implement functionality of other components described herein.

The communication networks can use wired communications, wireless communications, or combinations thereof. Further, the communication networks can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, devices can communicate with each other and other components with access to the respective networks 240, 250 via a communication protocol or multiple protocols. A protocol can be a set of rules that defines how nodes of the respective networks 240, 250 interact with other nodes. Further, communications between network nodes can be implemented by exchanging discrete packets of data or sending messages. Packets can include header information associated with a protocol (e.g., information on the location of the network node(s) to contact) as well as payload information.

Figure 3:
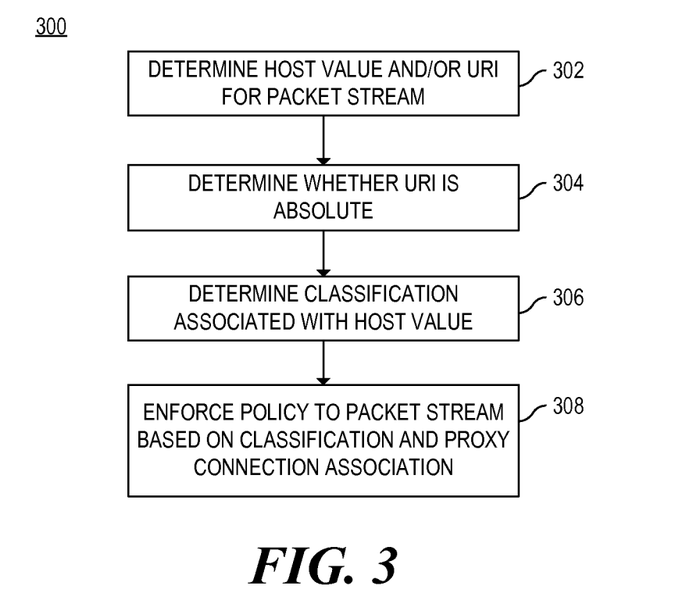
FIG. 3 is a flowchart of a method for enforcing a policy to a packet stream traveling via a proxy connection, according to an example.
Figure 4:
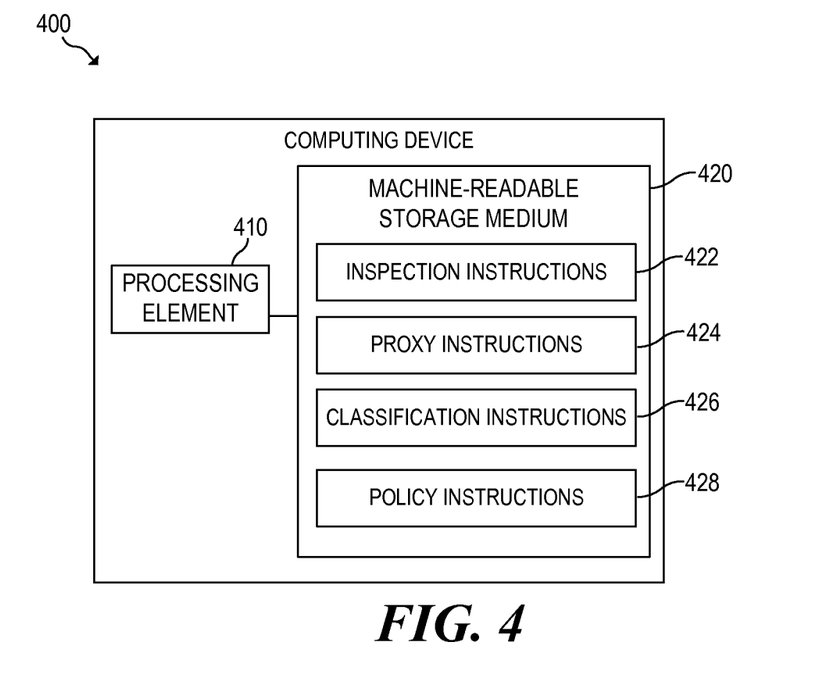
FIG. 4 is a block diagram of a computing device capable of enforcing a policy to a packet stream traveling via a proxy connection, according to an example.

FIG. 3 is a flowchart of a method for enforcing a policy to a packet stream traveling via a proxy connection, according to an example. FIG. 4 is a block diagram of a computing device capable of enforcing a policy to a packet stream traveling via a proxy connection, according to an example.

Although execution of method 300 is described below with reference to computing device 400, other suitable components for execution of method 300 can be utilized (e.g., network appliance 100). Additionally, the components for executing the method 300 may be spread among multiple devices. Method 300 may be implemented in the form of executable instructions stored on a machine-readable storage medium, such as storage medium 420, and/or in the form of electronic circuitry.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, multiple cores across multiple devices (e.g., if the computing device 400 includes multiple node devices), or combinations thereof. Processing element 410 may fetch, decode, and execute instructions 422, 424, 426, 428 to implement application of a policy to a packet stream based on a host value determined from a message of the packet stream. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for enforcing a policy to a packet stream traveling via a proxy connection.

The computing device 400 can receive a packet stream of a communication between an internal device within a private network that the computing device 400 is operating on and an external device outside of the private network. The communication can include multiple packets.

At 302, processing element 410 can execute inspection instructions 422 to determine a host value and URI for the packet stream. In one example, the host value, URI, or combination thereof can be determined from a message (e.g., a GET message or a CONNECT message) received as part of the packet stream or communication. In a GET message, the host value can be read from a host field and the URI can be determined from a location field. In a CONNECT message, the host value can be read from a host field.

As noted above, a determination can be made as to whether the communication is associated with a proxy connection. Proxy instructions 424 can be executed by processing element 410 to make the determination. As noted above, in one example, the presence of a CONNECT message can be used to determine the existence of the proxy connection. In another example, the presence can be based on a comparison of an IP address to a list of known or assumed proxy IP addresses. In a further example, at 304, the computing device 400 can determine whether the communication is associated with a proxy connection based on a structure of the URI, for example, based on whether the URI is absolute.

At 306, classification instructions 426 can be executed by the processing element 410 to determine a classification associated with the host value. In one example, the classification can be based on a mapping of host values to the classification (e.g., a reputation, a geolocation, etc.). In another example, the classification can be based on an address (e.g., IP address) determined based on the host value. As noted above, a DNS cache and/or DNS server can be used to determine the address from a host value.

In one example, the classification can include a reputation of the address. In this example, a list or other mapping or query technique can be used to derive the reputation from the address. For example, if the address is present on a blacklist, the reputation may be considered bad or malicious. In another example, the classification can include a geographic location of the external device. A list, mapping, or other query technique can be used to determine the geographic location. In some examples, the reputation can also be based on the geographic location.

At 308, policy instructions 428 can be executed by processing element 410 to enforce a policy to packets of the packet stream of the communication based on the classification and the proxy connection association. In some examples, if the proxy connection is not present, the host value need not be determined to find perform the policy on the communication. In other examples, the proxy connection is present and the classification is determined based on the host value. In one example, the policy can include implementing an action, such as a security action, based on the classification. For example, an action can be taken to drop a packet or multiple packets (e.g., each of the remaining packets) from the communication if a condition is met (e.g., the classification is identified as having a malicious reputation, a geographic location is located in an area associated with a malicious reputation, a host value is associated with a blacklist, etc.). As noted above, other actions can be taken as well, for example, monitoring the communication.

Figure 5:
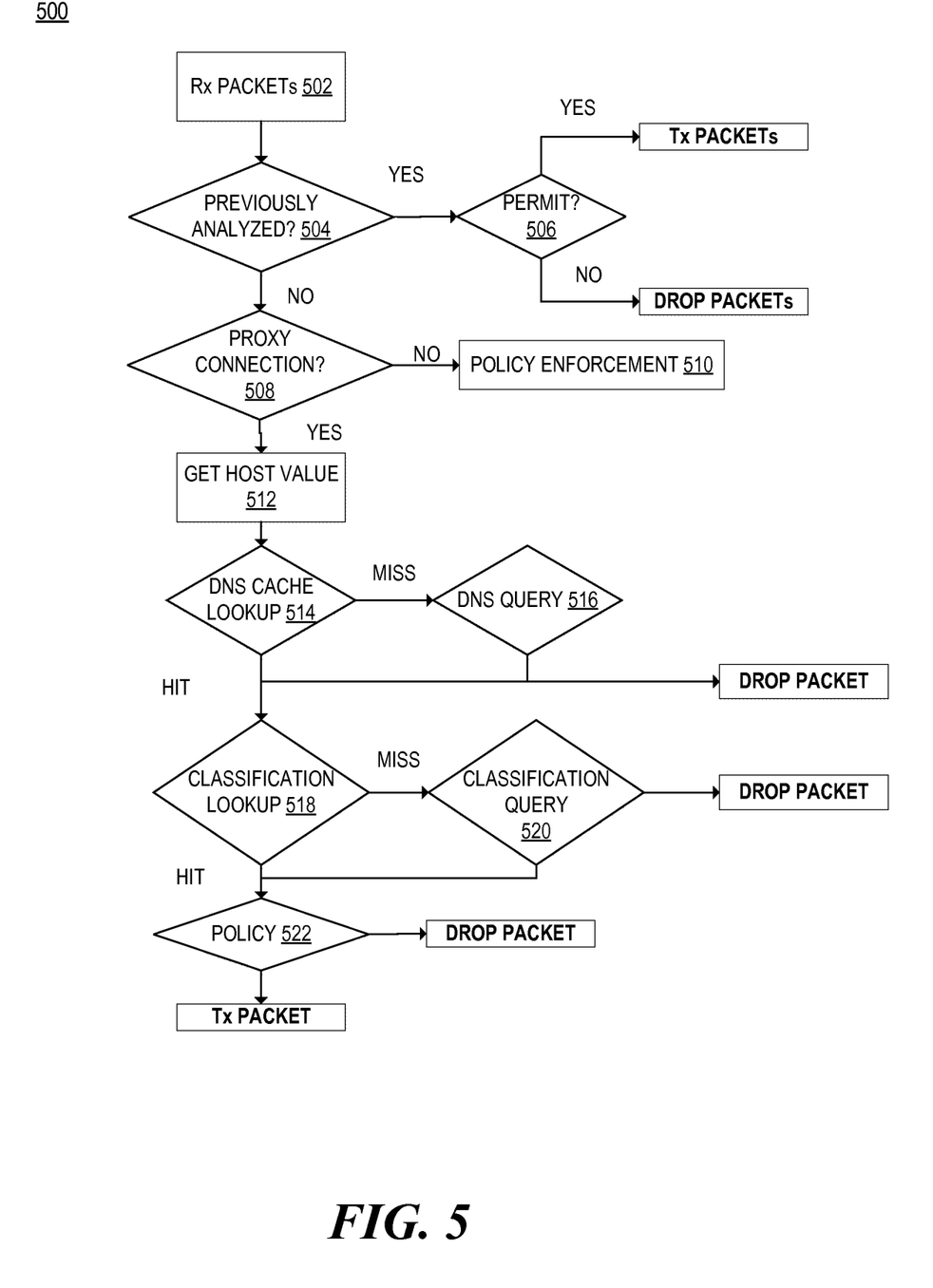
FIG. 5 is a flowchart of a method for enforcing a policy to a packet stream while accounting for a proxy connection, according to an example.

FIG. 5 is a flowchart of a method for enforcing a policy to a packet stream while accounting for a proxy connection, according to an example. Although execution of method 500 is described below with reference to a network appliance, the method 500 can be implemented using a network appliance 100, a computing device 400, or other suitable components for execution of the method 500. Method 500 may be implemented in the form of executable instructions stored on a machine-readable storage medium, such as storage medium 420, and/or in the form of electronic circuitry.

Method 500 tracks one example implementation of state logic used for enforcing or applying a policy to a packet stream while accounting for a proxy connection. The network appliance receives packets in a packet stream between an internal device in a private network and an external device from outside of the private network. At 502, the network appliance receives a packet that indicates the start of a new session between the internal device and the external device. An example of such a packet includes the Transmission Control Protocol (TCP) SYN packet, which is used to synchronize sequences of communications between devices.

At 504, the network appliance determines whether communications between the two devices have previously been analyzed. A table or other data structure can be used to keep track of communications between devices and previous decisions of whether to permit network traffic through the network appliance for the communication. If a communication between the devices and/or to/from the external device was previously analyzed, at 506, the network appliance uses the previous analysis to determine whether to permit the packet and packet stream to be transmitted to its destination or to drop the packet (or perform another security action).

If the analysis was not previously performed, at 508, the network appliance determines whether the packet stream is associated with a proxy connection. If there is not a proxy connection determined to be associated with the packet stream, at 510, conventional analysis and policy enforcement can be performed. The determination whether a proxy connection is associated with the packet stream can be implemented as described above.

If the packet stream is associated with a proxy connection, at 512, the packet stream can be analyzed to determine a host value. For example, packet inspection can be performed on a GET message, a CONNECT message, and/or other message that includes a field for the host value. At 514, an IP address for the host value can be looked up in a DNS cache. In one example, the cache can be implemented using hashing. For example, a mapping (e.g., a table or other data structure) of hash values (e.g., message-digest algorithm (MD5)) of host values to IP addresses can be kept. The network appliance can convert a host value string field to the hash key and use it as a key to the DNS cache lookup. The DNS cache can return the IP address of the external device (e.g., a web server) if a corresponding entry is found. If a corresponding entry is not found, at 516, a DNS query message can be generated and sent to a DNS server. While the DNS query is processing, GET and CONNECT request messages can be silently dropped. A response can be received indicating the IP address associated with the host value. The DNS cache can be updated to include a new entry for the host value and its corresponding IP address.

At 518, a classification can be determined for the IP address. In one example, the classification can implemented in a similar fashion as the DNS cache lookup and DNS server query. A classification can be looked up in a cache on the network appliance. If the classification is not found, a query can be made at 520 to an external server. As above, if a query is made outside of the network appliance, GET and CONNECT messages can be dropped until the query is resolved. In one example, the classification can be based on a reputation for the respective IP addresses. In another example, the classification can be based on a location.

As noted above, some geographical locations can be associated with malicious, unwanted, or unsafe activity. An added benefit of using locations instead of reputations for IP addresses is that locations can be scaled and there may be a delay in updating reputations for individual IP addresses.

At 522, a policy can be enforced based on the classification. For example, in the location classification example, a communication with a host value of the external device located in the United States may be permitted while a communication with a host value of the external device located in a part of Russia, Iran, China, etc. known for malicious activity (e.g., credit card fraud) may not be permitted. In this example, the network appliance further propagates permitted activity by transmitting packets in permitted network traffic communications. Further, in this example, the network appliance can drop packets for network traffic communications that are deemed not to be permitted.

Figure 6:
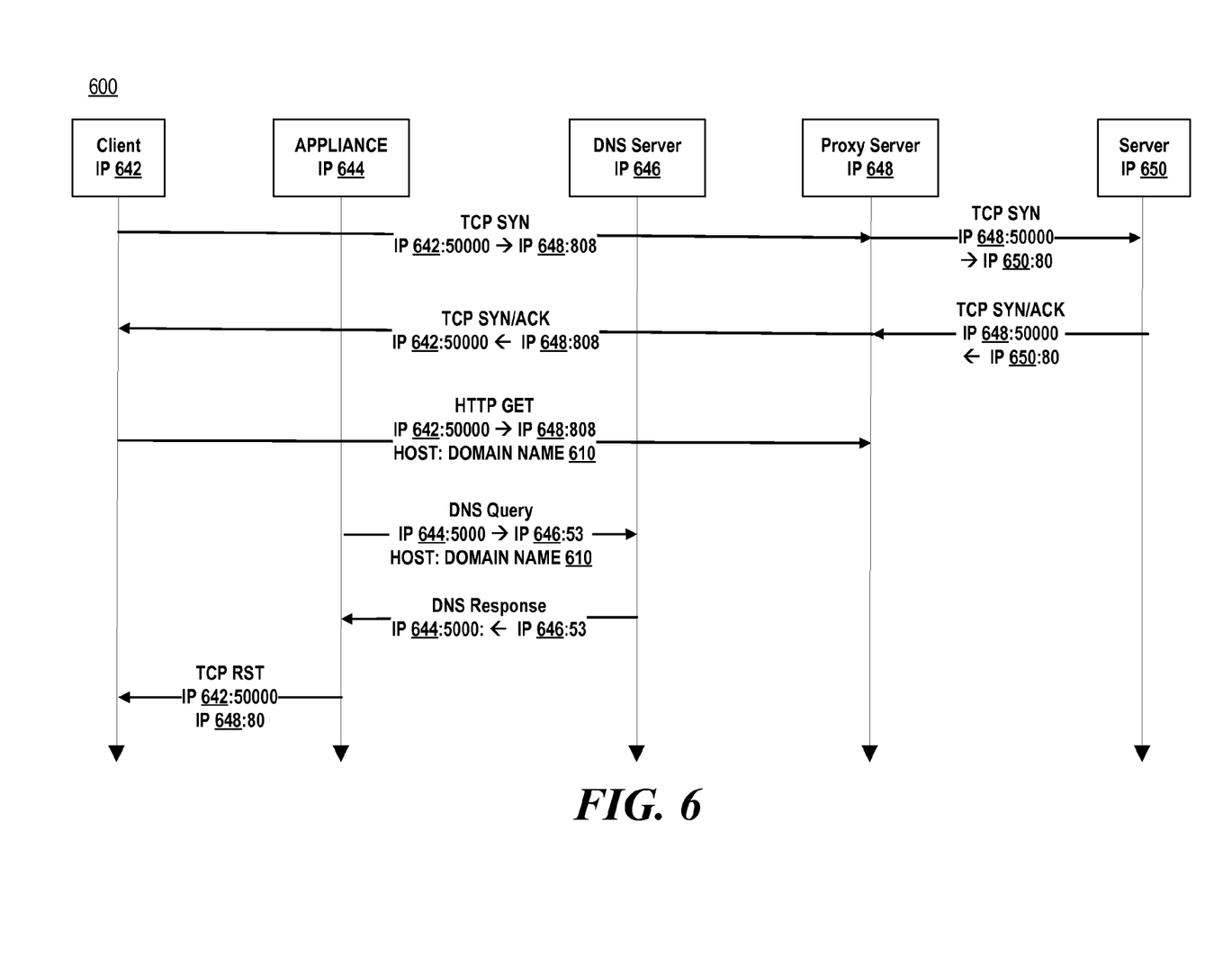
FIG. 6 is a ladder diagram of a system showing a packet flow that can be used for enforcing a policy, according to one example.

FIG. 6 is a ladder diagram of a system showing a packet flow that can be used for enforcing a policy, according to one example. Ladder diagram 600 includes a client with IP 642, an appliance with IP 644, a DNS server with IP 646, a proxy server with IP 648, and server with IP 650.

The client with IP 642 can connect to the server with IP 650 via the proxy server. In this example, the communication can be initiated by the client using a TCP SYN packet that is sent to the proxy server with IP 648. The proxy server can then send the TCP SYN packet to the server with IP 650.

The server with IP 650 then responds back with a TCP synchronize/acknowledgement (SYN/ACK) packet to the client with IP 642 via the proxy server with IP 648. As shown in FIG. 6, particular ports can be used in the communications based on protocols used. Other ports may also be used depending on the protocol used. The IP addresses in headers used by the packets are shown in FIG. 6.

In response to the SYN/ACK, the client with IP 642 sends a HTTP GET message to the Proxy Server with IP 648 for end device server with IP 650. As noted above, various approaches can be used to determine whether the proxy server is being used. For example, a URI can be extracted and analyzed from the GET message (e.g., an absolute URI indicates the use of a proxy server). Further, the GET message can be inspected to determine that the host value is domain name 610. The appliance with IP 644 can intercept the GET message on its way to the proxy server with IP 648.

As noted above a DNS cache or DNS query can be used to determine the IP address 650 for the server that is the end device. As shown in FIG. 6, a DNS query can be performed by the appliance with IP 644 to determine the IP 650 of the server. As such, DNS server with IP 646 can respond back to the Appliance with IP 644 with the DNS response.

With the IP address 650 of the server, the appliance can determine a classification of the server (e.g., determine a geolocation, a reputation, etc.). As noted above, the classification can be used to determine a policy implementation. For example, if the server with IP 650 is determined to have a malicious reputation, be located in a geolocation known or assumed to be malicious, etc., the policy may cause the appliance to implement a security action. In one example, the security action can include dropping or blocking packets from the communication. In another example, the security action can include sending a TCP reset to the client. If a TCP reset flag is set in a packet for a communication, it notifies the client that the client should stop using the TCP connection.

What is claimed is:

1. A network appliance comprising:
 a hardware processor; and
 a non-transitory machine-readable storage medium encoded with instructions executable by the hardware processor to:
 receive a packet stream;
 determine that the packet stream is associated with a proxy connection by:
 determining an internet protocol (IP) address in a header of a first packet of the packet stream,
 comparing the IP address with a list of known proxy servers, and
 based upon matching the IP address with a second IP address in the list of known proxy servers, determining that the packet stream is associated with the proxy connection;
 determine a host value for a true end device of the packet stream from a message of the packet stream;
 determine a classification associated with the host value; and
 enforce a policy to the packet stream based on the classification and the determination that the proxy connection is associated with the packet stream.

2. The network appliance of claim 1, the instructions executable by the hardware processor to:
 determine an address based on the host value, wherein the classification includes a reputation associated with the address, and wherein the policy includes blocking a session associated with the packet stream by dropping a plurality of packets of the stream based on the reputation.

3. The network appliance of claim 1, the instructions executable by the hardware processor to:
 determine an address based on the host value; and
 determine a geographic location based on the address, wherein the classification includes the geographic location.

4. The network appliance of claim 3, the instructions executable by the hardware processor to:
 compare the geographic location to a list, wherein the policy is based on whether the geographic location is on the list.

5. The network appliance of claim 1, wherein the message includes a Uniform Resource Identifier (URI).

6. The network appliance of claim 5, wherein the message is a GET message or a CONNECT message.

7. The network appliance of claim 5, wherein the packet stream is determined to be associated with the proxy connection because a structure of the URI is absolute.

8. A computer implemented method comprising:
executing inspection instructions to determine a Uniform Resource Identifier (URI) for a packet stream;
determining whether the URI is absolute or relative, wherein the URI is relative when the URI does not include full naming scheme information;
when the URI is relative, determining a host value from the packet stream, wherein the host value is listed outside of a header of a packet in the packet stream;
when the URI is absolute, determining that the packet stream is associated with a proxy connection;
determining a classification associated with the host value; and
based on the classification and the determination that the URI is absolute, enforcing a policy to a plurality of packets of the packet stream.

9. The method of claim 8, further comprising:
determining that the packet stream is associated with a proxy connection when the URI is determined to be absolute.

10. The method of claim 8, further comprising:
determining an address based on the host value; and
determining a geographic location based on the address;
wherein the classification includes the geographic location, and wherein the policy is further based on the geographic location.

11. The method of claim 10, further comprising:
blocking a session associated with the packet stream by dropping the plurality of the packets of the packet stream based on whether the geographic location is on a list.

12. The method of claim 8, further comprising:
determining an address based on the host value;
determining a reputation for the address, wherein the classification includes the reputation, and blocking a session associated with the packet stream by dropping the plurality of packets of the packet stream based on the reputation.

13. A non-transitory machine-readable storage medium storing instructions that, when executed by a physical processing element of a computing device, cause the computing device to:
determine a host value for a communication between a first device and a second device, wherein the communication includes a plurality of packets, and wherein the host value represents one of the first device and the second device;
determine that the communication is associated with a proxy connection by:
determining an internet protocol (IP) address in a header of a first packet of the plurality of packets,
comparing the IP address with a list of known servers, wherein the list of known servers correspond with known reputation information, and
based upon matching the IP address with a second IP address in the list of known servers, determining that the communication is associated with the proxy connection;
determine a reputation of one of the first device and the second device associated with the known reputation information in the list of known servers; and
based on the determination of the reputation and the communication being associated with the proxy connection, enforce a policy to the plurality of the packets of the communication.

14. The non-transitory machine-readable storage medium of claim 13, further comprising instructions that, if executed by the physical processing element, cause the computing device to:
determine a geographic location based on the IP address, wherein the reputation is based on the geographic location.

15. The non-transitory machine-readable storage medium of claim 13, further comprising instructions that, if executed by the physical processing element, cause the computing device to:
receive a message as part of the communication, wherein the message is a GET message, wherein the host value is determined from the GET message; and
determine a Uniform Resource Identifier (URI) from the message, wherein the determination that the communication is associated with the proxy connection is based on a structure of the URI.

* * * * *